(12) United States Patent
Aasheim et al.

(10) Patent No.: US 8,171,785 B2
(45) Date of Patent: May 8, 2012

(54) METHOD FOR THE CALCULATION OF FLUID INTERFACE LEVEL

(75) Inventors: Robert Aasheim, Porsgrunn (NO); Taale Stette, Skien (NO)

(73) Assignee: Statoilhydro ASA, Stavanger (NO)

(\*) Notice: Subject to any disclaimer, the term of this patent is extended or adjusted under 35 U.S.C. 154(b) by 462 days.

(21) Appl. No.: 12/310,535

(22) PCT Filed: Aug. 27, 2007

(86) PCT No.: PCT/NO2007/000302
§ 371 (c)(1), (2), (4) Date: May 18, 2009

(87) PCT Pub. No.: WO2008/026934
PCT Pub. Date: Mar. 6, 2008

(65) Prior Publication Data
US 2010/0186498 A1    Jul. 29, 2010

(30) Foreign Application Priority Data

Aug. 28, 2006   (NO) .................................. 20063815

(51) Int. Cl.
*G01F 23/00* (2006.01)
(52) U.S. Cl. ..................................... 73/290 R; 73/64.55
(58) Field of Classification Search ............... 73/290 R, 73/64.55
See application file for complete search history.

(56) References Cited

U.S. PATENT DOCUMENTS

| | | | | |
|---|---|---|---|---|
| 3,721,121 A | * | 3/1973 | Fierfort | 73/152.42 |
| 4,471,656 A | * | 9/1984 | Sanders et al. | 73/438 |
| 6,104,033 A | | 8/2000 | Graeme | |
| 6,345,683 B1 | * | 2/2002 | Gordon et al. | 181/124 |
| 6,548,814 B1 | | 4/2003 | Gronli | |
| 6,633,625 B2 | | 10/2003 | Jackson et al. | |

FOREIGN PATENT DOCUMENTS

| | | |
|---|---|---|
| EP | 0 060 630 | 9/1982 |
| GB | 2 326 232 | 12/1998 |

(Continued)

OTHER PUBLICATIONS

Patent Cooperation Treaty (PCT) International Preliminary Report on Patentability, issued Mar. 3, 2009 in corresponding International Application No. PCT/NO2007/000302.

(Continued)

*Primary Examiner* — Hezron E Williams
*Assistant Examiner* — Rodney T Frank
(74) *Attorney, Agent, or Firm* — Wenderoth, Lind & Ponack, L.L.P.

(57) ABSTRACT

A method calculates the boundary layer level between fluids, in particular the boundary layer level between oil and water in connection with the use of a segment-based boundary layer meter. The calculations are based on the use of measurement signals from a number of segments, n, and the boundary layer level, L, of the water is calculated as follows:

$$L = \frac{\bar{\rho} - \rho_0}{\rho_v - \rho_0}(L_u - L_l) + L_l$$

where:
$L_u$ Upper water range area
$L_l$ Lower water range area
$\rho_n$ Density of segment no. n from the profile meter
$\underline{\rho}_n$ Corrected density for segment no. n
$\bar{\rho}$ Calculated mean density
$\rho_v$ Mean density of water from the profile meter
$\rho_o$ Mean density of oil from the profile meter
N Total number of segments included.

1 Claim, 2 Drawing Sheets

Gas
Oil
Emulsion
Water

FOREIGN PATENT DOCUMENTS

| | | |
|---|---|---|
| RU | 2 188 396 | 8/2002 |
| WO | 99/17085 | 4/1999 |
| WO | 03/012379 | 2/2003 |

OTHER PUBLICATIONS

International Search Report issued Nov. 26, 2007 in International (PCT) Application No. PCT/NO2007/000302.

Written Opinion of the International Searching Authority issued Nov. 26, 2007 in International (PCT) Application No. PCT/NO2007/000302.

Notification of First Office Action (PCT Application in the National Phase) issued Apr. 28, 2010 in corresponding Chinese Patent Application No. 200780032342.X.

\* cited by examiner

Gas
Oil
Emulsion
Water

METHOD FOR THE CALCULATION OF FLUID INTERFACE LEVEL

BACKGROUND OF THE INVENTION

The present invention concerns a method for calculating the boundary layer level between fluids, in particular the boundary layer level between oil and water in connection with the use of a segment-based boundary layer meter.

In many different contexts, such as a separator in a process system or production installation for oil and gas, in which water is an undesired component, it may be desirable to determine the level of the respective fluids (oil, water and gas) in the separator. The purpose of such a measurement may, for example, be to control the level in the separator. To achieve good level control, the level measurement must be "robust" and consistent. For level measurement of the water level in separators, however, this may be a challenge on account of an emulsion of oil and water.

In connection with the measurement of the level of fluids, it is possible to use a so-called profile meter that is designed to detect the boundary between the various phases (each fluid or the mixture of fluids). The profile meter consists of a large number of segments arranged in a vertical row above/below each other. Each segment is designed to detect a state or property in connection with the fluid to be detected, and emits a signal to a registration/calculation unit. Such meters may, for example, be based on inductive measurement, capacitive measurement or radioactive sources.

For most prior art profile meters, it is difficult to detect changes in density for the respective fluid(s) or fluid mixture(s), which means that the measurements may contain a lot of "noise". Furthermore, the measurements are not very continuous, as a standard algorithm used for the prior art solutions selects the "correct" segment for the phase change, based on the use of the registrations from 2 segments, for the level calculation by means of linear interpolation.

SUMMARY OF THE INVENTION

The present invention concerns a method for calculating the level or boundary layer between the different phases in a fluid based on the use of signals from several segments, thus producing much more reliable, more consistent calculations over time.

The present invention is characterized by the features described below.

BRIEF DESCRIPTION OF THE DRAWINGS

The present invention will be described in further detail in the following by means of examples and with reference to the figures, wherein.

DETAILED DESCRIPTION OF THE INVENTION

Figure 1:
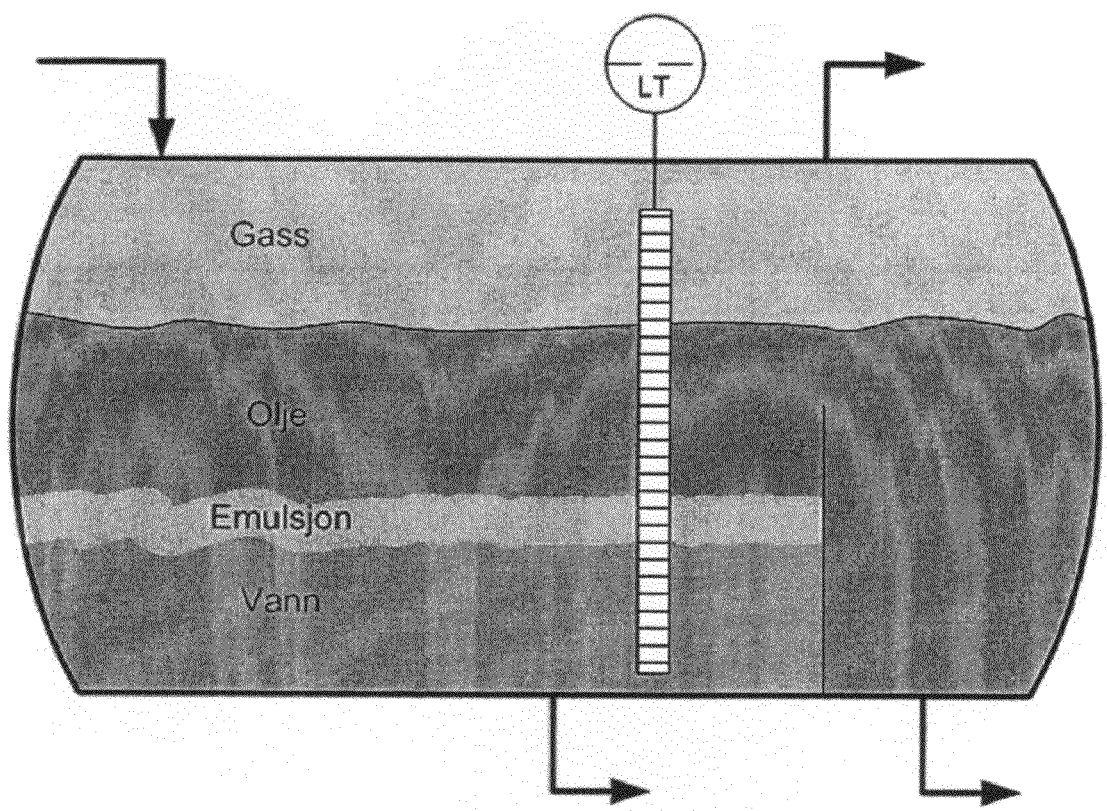
FIG. 1 is a simple drawing of a 150-segment profile meter used for the method in accordance with the present invention.

As stated above, level control requires robust, continuous measurement with minimum noise. This can be achieved using measurement signals from several segments in a profile meter. FIG. 1 shows a profile meter 1 used for the method in accordance with the present invention. The profile meter 1 in the present example measures the density profile in a separator for gas, oil and water in a vertical direction with a "resolution" of 150 segments 2 (i.e., the profile meter is based on the use of 150 segments arranged above/below each other).

Figure 2:
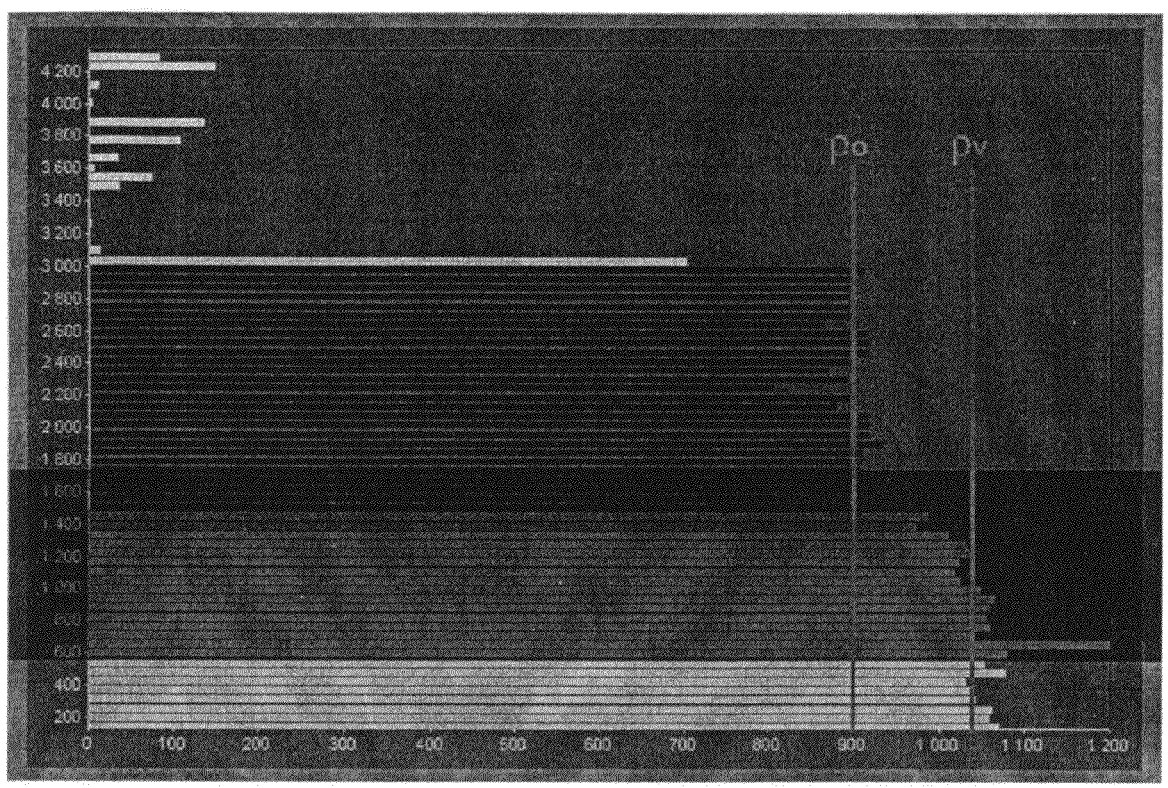
FIG. 2 shows a printout in the form of a bar chart of measurements from such a 150-segment profile meter.

A selection of these segments in the relevant area, for example for the water level, is selected. FIG. 2 shows a printout in the form of a bar chart of measurements from such a 150-segment profile meter arranged in a separator for oil, water and gas, and shows the principle for selecting segments (shown as the shaded area) as the basis for the calculation. The selected area goes from the bottom over any sand layer to a little above the overflow to the oil outlet. Values for mean density are also shown in FIG. 2. The figure shows that the water has a mean density of approximately 1040 kg/m$^3$ and the oil has a mean density of approximately 900 kg/m$^3$. These values are used for calibration in the calculation of the boundary level for oil and water. The boundary level is calculated by calculating the proportion of oil and water. The boundary level lies right between these volumes, regardless of whether the oil and the water are separate or in the form of an emulsion. If there is an emulsion between the oil and water phases, the level will be calculated as the center of the emulsion.

In order for the calculation to be correct, there may be no more than two components, oil and water (or a mixture of these components, an emulsion). This means that the correct measurement is not achieved if gas is registered in the highest segments and/or sand in the lowest segments. This problem can be avoided by defining "legal" values for the density of the segments. For instance, it is possible to set the following:
If density<oil (i.e. gas)→density=density of oil.
If density>water (i.e. sand)→density=density of water.
Density "corrected for gas and sand" is then:

$$\hat{\rho}_n = \max(\min(\rho_n; \rho_v); \rho_o) \qquad (1)$$

Mean density is then calculated as follows:

$$\bar{\rho} = \frac{1}{N} \sum_{n=1}^{N} \hat{\rho}_n \qquad (2)$$

and the boundary layer level is calculated as follows:

$$L = \frac{\bar{\rho} - \rho_0}{\rho_v - \rho_0}(L_u - L_l) + L_l \qquad (3)$$

Where:
L Calculated water level
$L_u$ Upper water range area (*)
$L_l$ Lower water range area (*)
$\rho_n$ Density of segment no. n from the profile meter
$\hat{\rho}_n$ Corrected density for segment no. n
$\bar{\rho}$ Calculated mean density
$\rho_v$ Mean density of water from the profile meter
$\rho_o$ Mean density of oil from the profile meter
N Total number of segments included The method in accordance with the present invention may easily be implemented in a suitable computer program and adapted to the registration equipment for the relevant segment profile meter in each individual measurement situation. The implementation may also easily take place directly in the automation system if the value of relevant segments is or can be made available. These ranges indicated by * are defined within the segments on the profile meter.

The invention claimed is:
1. A method of calculating a boundary layer level between oil and water in a fluid, said method comprising:
obtaining measurement signals using a segment-based profile meter, the measurement signals representing densities measured from a number of segments, n, of the fluid;

determining a corrected density for each segment based on the measurement signals using the profile meter and the formula:

$$\hat{\rho}_n = \max(\min(\rho_n; \rho_v); \rho_o)$$

wherein:
$\rho_n$ is a density of segment number n obtained by the profile meter,
$\rho_v$ is a mean density of water obtained by the profile meter,
$\rho_o$ is a mean density of oil obtained by the profile meter, and
$\hat{\rho}_n$ is a corrected density for segment number n;
calculating a mean density of the fluid using the profile meter and the formula:

$$\bar{\rho} = \frac{1}{N} \sum_{n=1}^{N} \hat{\rho}_n$$

wherein:
N is a total number of segments measured by the profile meter, and
$\bar{\rho}$ is a calculated mean density of the fluid; and
calculating a boundary layer level of the fluid using the profile meter and the formula:

$$L = \frac{\bar{\rho} - \rho_0}{\rho_v - \rho_0}(L_u - L_l) + L_l$$

wherein:
$L_u$ is an area of an upper water range of a segment,
$L_l$ is an area of a lower water range of a segment, and
L is a boundary layer level of the fluid.

\* \* \* \* \*